US007447356B2

United States Patent
Ohsawa et al.

(10) Patent No.: US 7,447,356 B2
(45) Date of Patent: Nov. 4, 2008

(54) IMAGE SIGNAL CORRECTION METHOD AND IMAGE SIGNAL CORRECTION APPARATUS

(75) Inventors: Seiji Ohsawa, Aiko-gun (JP); Kohei Inamura, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 890 days.

(21) Appl. No.: 11/053,913

(22) Filed: Feb. 10, 2005

(65) Prior Publication Data

US 2005/0185099 A1      Aug. 25, 2005

(30) Foreign Application Priority Data

Feb. 19, 2004    (JP)    ............... 2004-042487

(51) Int. Cl.
*G06K 9/00*     (2006.01)
(52) U.S. Cl. ................ 382/167; 382/162; 382/274; 348/675; 345/690
(58) Field of Classification Search ............... 382/162, 382/167, 274; 348/675, 453; 345/690, 589, 345/593, 597, 605
See application file for complete search history.

(56) References Cited

U.S. PATENT DOCUMENTS

| 5,450,217 | A | | 9/1995 | Eschbach et al. ............ 358/518 |
| 5,661,575 | A | * | 8/1997 | Yamashita et al. ........... 358/519 |
| 6,058,207 | A | | 5/2000 | Tuijn et al. .................. 382/162 |
| 6,101,271 | A | * | 8/2000 | Yamashita et al. ........... 382/167 |
| 6,111,607 | A | | 8/2000 | Kameyama |
| 6,169,530 | B1 | | 1/2001 | Mori et al. ..................... 345/93 |
| 6,683,594 | B1 | | 1/2004 | Mori et al. ..................... 345/93 |
| 6,873,308 | B2 | | 3/2005 | Sagano et al. ............... 345/75.2 |
| 6,963,668 | B2 | * | 11/2005 | Engeldrum et al. ......... 382/233 |
| 2004/0113905 | A1 | | 6/2004 | Mori et al. ................... 345/204 |

FOREIGN PATENT DOCUMENTS

| EP | 1 164 562 A2 | 12/2001 |
| JP | 06-311354 | 11/1994 |
| JP | 08-315132 | 11/1996 |
| JP | 09-331539 | 12/1997 |
| JP | 2001-008218 | 1/2001 |

OTHER PUBLICATIONS

May 22, 2007 Japanese Official Action in Japanese Patent Appln. No. 2004-042487.
Jul. 20, 2007 Chinese Official Action in Chinese Patent Application No. 200510009315.3 (with English translation).
Oct. 18, 2006 Search Report in European Patent Appln. No. 05 00 1835.
Abstracts for JP-A 6-311354.

* cited by examiner

*Primary Examiner*—Matthew C Bella
*Assistant Examiner*—Ali Bayat
(74) *Attorney, Agent, or Firm*—Fitzpatrick, Cella, Harper & Scinto

(57) ABSTRACT

The objective of the present invention is to enhance a specific color without changing the hue of an original image.

At least two different gray-level correction functions are provided for luminance signals input for three colors, R, G and B, and these functions are used to calculate correction coefficients for the individual colors. Then, the luminance signals input for the three colors are synthesized so that the weighting of the colors is changed in accordance with the input luminance signals, and a correction coefficient is calculated that is used in common. The input signals are then multiplied by the thus obtained correction coefficient.

6 Claims, 9 Drawing Sheets

IMAGE SIGNAL CORRECTION METHOD AND IMAGE SIGNAL CORRECTION APPARATUS

BACKGROUND OF THE INVENTION

1. Field of the Invention

The present invention relates to an image signal correction method and an image signal correction apparatus, for suppressing changes in the hues of color images and for correcting gray levels during color image signal processing.

2. Related Background Art

Recently, for color images on television, an image signal correction process, such as gray-level correction or color correction, has frequently been employed to enhance or to correct ergonomic contrasts and ergonomic brightnesses or hues.

As a first conventional gray-level correction technique, processing is well known wherein gray-level correction having the concave input/output characteristics shown in FIG. 6 is performed for the color input luminance signal of an image to improve the ergonomic contrast of the image. For example, assume that luminance signals for three separate colors, red (R), green (G) and blue (B), are input. When the luminance signals input for the three colors RGB are $(R_{in1}, G_{in1}, B_{in1}) = (0.3, 0.4, 0.5)$ and $(R_{in2}, G_{in2}, B_{in2})=(0.7, 0.8, 0.9)$, the gray-level transform shown in FIG. 6 is performed to obtain $(R_{out1}, G_{out1}, B_{out1})=(0.09, 0.16, 0.25)$ and $(R_{out2}, G_{out2}, B_{out2})=(0.49, 0.64, 0.81)$. When calculations are performed while the luminance level L of the image is defined as $L=0.2125R+0.7154G+0.0721B$ (ITU-R BT709), $L_{in1}=0.386$, $L_{out1}=0.152$, $L_{in2}=0.786$ and $L_{out2}=0.620$ are obtained. The ratios of these levels are $L_{in2}/L_{in1}=0.786/0.386=2.04$, $L_{out2}/L_{out1}=0.620/0.152=4.09$, $L_{out1}/L_{in1}=0.393$ and $L_{out2}/L_{in2}=0.789$. In this case, the luminance is reduced but the contrast is increased.

As a second conventional gray-level correction technique, processing is well known whereby gray-level correction having the convex input/output characteristics shown in FIG. 7 is performed to improve the ergonomic brightness of an image. When luminance signals input for the three RGB colors are $(R_{in1}, G_{in1}, B_{in1})=(0.3, 0.4, 0.5)$ and $(R_{in2}, G_{in2}, B_{in2})=(0.7, 0.8, 0.9)$, the gray-level transform shown in FIG. 7 is performed to obtain $(R_{out1}, G_{out1}, B_{out1})=(0.548, 0.632, 0.707)$ and $(R_{out2}, G_{out2}, B_{out2})=(0.837, 0.894, 0.949)$. And through calculation, the luminance level L of the image is obtained as $L_{in1}=0.386$, $L_{out1}=0.620$, $L_{in2}=0.786$ and $L_{out2}=0.886$. The ratios of these levels are $L_{in2}/L_{in1}=0.786/0.386=2.04$, $L_{out2}/L_{out1}=0.886/0.620=1.43$, $L_{out1}/L_{in1}=1.61$ and $L_{out2}/L_{in2}=1.13$. In this case, the contrast is reduced but the luminance is increased.

However, a problem has arisen that these conventional examples have in common: the RGB ratio is also changed before and after the gray-level correction, and accordingly the hues are altered.

A technique to resolve this problem is disclosed in Japanese Patent Application Laid-Open No. H06-311354 (third conventional gray-level correction technique).

Employed for the technique disclosed in Japanese Patent Application Laid-Open No. H06-311354 is a configuration, shown in FIG. 8, comprising: a preliminary signal processing unit 21; a non-linear transforming unit 22; a color correction unit 23; a signal processing unit 24; a color image signal input terminal 25, for sequentially receiving color image signals; and a color image signal output terminal 26 for outputting color image signals. The preliminary signal processing unit 21 performs the preliminary image signal processing, such as the removal of noise, and the non-linear transforming unit 22 performs the gray-level correction. The color correction unit 23 performs the color correction for the signal output by the non-linear transforming unit 22, and the signal processing unit 24 performs the post-processing for the signal.

The non-linear transforming unit 22, which is the primary unit, calculates $M=\max(R_{in}, G_{in}, B_{in})$ $R_{out}=f(M) \cdot R_{in}/M$ $G_{out}=f(M) \cdot G_{in}/M$ $B_{out}=f(M) \cdot B_{in}/M$ (Expression 1)

and outputs the results. In Expression 1, max( ) denotes a function for selecting the maximum value; $R_{in}$, $G_{in}$ and $B_{in}$ denote input RGB color signals; $R_{out}$, $G_{out}$ and $B_{out}$ denote output RGB color signals; and f( ) denotes a gray-level correction function.

When Expression 1 is transformed, Expression 2 below is obtained, $C=f(M)/M$ $R_{out}=R_{in} \cdot C$ $G_{out}=G_{in} \cdot C$ $B_{out}=B_{in} \cdot C$ (Expression 2)

while the RGB ratio is not changed before and after the gray-level correction, and the hue is unchanged.

In Japanese Patent Application Laid-Open No. H06-311354, a configuration is also described wherein RGB signals are transformed into L*a*b*, or Luv, according to the CIE (Commission Internationale d'Eclairage), the gray-level correction is performed only for the luminance component (L* or L), and thereafter, the resultant signal is inversely transformed. Again, in this case, since only the luminance component is transformed and the color components are not changed, the hue is unchanged.

There is another conventional example wherein the gray-level correction is performed only for the Y component of a YUV signal, which is one type of television broadcasting signal.

As an additional conventional color correction example, there is one that employs well known processing whereby, as is shown in FIG. 9, the hue of an image is corrected by employing different gray-level correction functions for the color input luminance signals R, G and B, i.e., functions $f_r(x)$, for R, $f_g(x)$, for G, and $f_b(x)$, for B (wherein x is an arbitrary value). For example, when the input RGB luminance signals are $(R_{in1}, G_{in1}, B_{in1})=(0.3, 0.4, 0.5)$ and $(R_{in2}, G_{in2}, B_{in2})=(0.7, 0.8, 0.9)$, the gray-level correction shown in FIG. 9 is performed, and $(R_{out1}, G_{out1}, B_{out1})=(0.36, 0.4, 0.5)$ and $(R_{out2}, G_{out2}, B_{out2})=(0.84, 0.8, 0.9)$ are obtained. As a result, the ratio R obtained by the gray-level correction is greater than it was before the correction was made, and the reddish hue is enhanced in color.

Furthermore, Japanese Patent Application Laid-Open No. H08-315132 discloses, as a method for performing selective-corrections for an original image, a color correction method whereby, to change a selected, individual color, two or more selective color corrections are jointly employed in correspondence with the performance of a weighted, average correction process, during which a weighted value is reduced in consonance with selected changes in an original color.

There is also a case wherein, for an image, it is desired that, within a specific range, a color be enhanced without a hue being changed. And if the above described conventional color correction techniques, which use different gray-level correction functions for the RGB colors, were employed, the hue would be changed.

As a method for enhancing a color within a specific range without changing the hue, a third gray-level correction method described in related background art can be employed for the color enhancement. According to this method, different gray-level correction functions are provided for the RGB colors, gray-level correction is performed for the R, G or B color signal having the maximum value, and the other color signals are multiplied by the resultant signal, which uses as a coefficient the ratio of the RGB colors before and after the gray-level correction is performed (see FIG. 10).

The configuration in FIG. 10 comprises: a selector 31, for selecting the maximum value of the RGB signal values that are input; a comparator 32, for outputting information consonant with the R, G or B signal having the maximum value; a switch 33, for selecting, in accordance with the output of the comparator 32, either the R or the G or the B gray-level correction data, which will be described later; an R-gray-level correction data table 34 from which R-gray-level correction data are obtained in accordance with an instruction transmitted by the switch 33, a G-gray-level correction data table 35 from which G-gray-level correction data are obtained in accordance with an instruction transmitted by the switch 33 or a B-gray-level correction data table 36 from which B-gray-level correction data are obtained in accordance with an instruction transmitted by the switch 33, and a gray-level correction unit 37, for applying, for the output value of the selector 331, the gray-level correction data obtained from the gray-level correction data table 34, 35 or 36; a divider 38; and multipliers 39, 40 and 41.

When the RGB gray-level correction functions are as shown in FIG. 11 (the contents of the R-gray-level correction data table 34 are $f_r(x)$, indicated by a solid line, the contents of the G-gray-level correction data table 35 are $f_g(x)$, indicated by a broken line, and the contents of the B-gray-level correction data table 36 are $f_b(x)$, indicated by a chained line), and when $(R_{in}, G_{in}, B_{in})=(0.7, 0.3, 0.5)$, for example, is input, the comparator 32 determines that R has the highest value and transmits a corresponding signal to the switch 33, which selects the R-gray-level correction data table 34. From among the RGB values, the selector 31 selects a maximum value of 0.7 that it transmits to the gray-level correction unit 37 and the divider 38. The gray-level correction unit 37 corrects $R_{in}$ by referring to the R-gray-level correction data table 34, and outputs a value 0.9 to the divider 38. The divider 38 divides the value 0.9, obtained following the correction, by the value 0.7, input before the correction, and outputs the value 1.286 as a correction coefficient. The multipliers 39, 40 and 41 multiply the original RGB values by the correction coefficient received from the divider 38, and output $(R_{out}, G_{out}, B_{out})=(0.9, 0.39, 0.64)$. At this time, $R_{out}:G_{out}:B_{out}=0.9:0.39:0.64=0.7:0.3:0.5=R_{in}:G_{in}:B_{in}$, and the hue is maintained unchanged.

When $(R_{in}, G_{in}, B_{in})=(0.5, 0.7, 0.3)$ is input, the same processing is performed and the G-gray-level correction data table 35 is selected because G has the highest value, and $(R_{out}, G_{out}, B_{out})=(0.32, 0.45, 0.19)$ is output. At this time, $R_{out}:G_{out}:B_{out}=0.32:0.45:0.19=0.5:0.7:0.3=R_{in}:G_{in}:B_{in}$, and the hue is maintained unchanged.

Similarly, when $(R_{in}, G_{in}, B_{in})=(0.3, 0.5, 0.7)$ is input, $(R_{out}, G_{out}, B_{out})=(0.3, 0.5, 0.7)$ is output, and the color and the luminance are unchanged.

That is, in this case, the luminance is increased for the hue (a reddish hue) when R has the highest value, the luminance is reduced for the hue (a greenish hue) when G has the highest value, and the luminance is unchanged for the hue (a bluish hue) when B has the highest value.

Generally, when the convex characteristics are provided for the gray-level correction function that corresponds to the R, G or B hue to be enhanced, the luminance of the pertinent hue is increased. While when the concave characteristics are provided for the gray-level correction function that corresponds to the hue that is not to be enhanced, the luminance of this hue is reduced. By employing this method, a color within a specific range can be enhanced.

However, with this configuration the following problem is encountered. FIG. 12 is a graph showing R and G signals along a specific horizontal line on a display device, and a correction coefficient output by the divider 38 and a luminance value on a display screen. When a signal B has a value of 0 across the entire area, as is shown in FIG. 12, the maximum value of the R component is to the left, and is reduced toward the right. At the position where R is at its maximum, a G signal has a value of 0. The value of this G component is increased toward the right and is at its maximum at a location whereat the R component has a value of 0. Thus, the R and G values are equal at the center, while to the left thereof, an area is represented wherein a hue becomes increasingly reddish, while to the right thereof, an area is represented wherein the hue becomes increasingly greenish.

Since the maximum value of the R component is in the left half in the graph, the correction coefficient is calculated by using the R-gray-level correction function $f_r(x)$ in FIG. 11. In this example, the correction coefficient is always one or greater, and in the graph, is increased to the right and upward. Further, since the maximum value of the G component is in the right half, the correction coefficient is calculated by using the G-gray-level correction function $f_g(x)$ The obtained correction coefficient is always one or smaller, and is reduced to the left and downward. The changes in the luminance at this time are as shown in FIG. 12, and the difference in the luminance levels appears as a border in the center of the graph.

SUMMARY OF THE INVENTION

To resolve these problems, it is one objective of the present invention to provide an image signal correction method and an image signal correction apparatus for enhancing a specific color without changing the hue of the original image.

To achieve this objective, according to the present invention, an image signal correction method, for correcting luminance signals input for three colors in accordance with at least two different gray-level correction functions, comprises the steps of:

employing the gray-level correction functions for the individual three colors to obtain transform values for the luminance signals input for the three colors;

calculating a correction coefficient used in common for individual colors that are synthesized so as to change the weighting for the colors in accordance with the luminance signals that are input for the three colors; and multiplying the luminance signals that are input by the correction coefficient.

Furthermore, according to the present invention, an image signal correction apparatus, for correcting luminance signals input for three colors in accordance with at least two different gray-level correction functions, comprises:

a correction unit for employing the gray-level correction functions for the individual three colors to obtain transform values for the luminance signals input for the three colors;

a correction coefficient calculation unit for calculating a correction coefficient used in common for individual colors that are synthesized so as to change the weighting for the colors in accordance with the luminance signals that are input for the three colors; and a multiplication unit for multiplying the luminance signals that are input by the correction coefficient.

According to the present invention, a color within a specific range can be enhanced without changing the hue.

DETAILED DESCRIPTION OF THE PREFERRED EMBODIMENTS

First Embodiment (Overview) Assume that RGB values obtained by color decomposition of an input image luminance signal are $R_{in}$, $G_{in}$ and $B_{in}$, and that the gray level correction function for R is denoted by $f_r(x)$, the gray level correction function for G is denoted by $f_g(x)$, and the gray level correction function for B is denoted by $f_b(x)$. Further, assume that $K_r$ denotes the ratio of the input R value to the output value (a transform value) obtained by the gray-level correction function, $K_g$ denotes the ratio of the input G value to the output value (a transform value) obtained by the gray-level correction function, and $K_b$ denotes the ratio of the input G value to the output value (a transform value) obtained by the gray-level correction function. Then, $K_r$, $K_g$ and $K_b$ are represented as in Expression 3.

$$K_r = f_r(R_{in})/R_{in}$$

$$K_g = f_g(G_{in})/G_{in}$$

$$K_b = f_b(B_{in})/B_{in} \qquad \text{(Expression 3)}$$

Correction coefficient C for a pixel is obtained by using a weighted average, i.e., by adding weights consonant with the input RGB values to these ratios. That is, Expression 4 below is established.

$$\begin{aligned} C &= (R_{in}^2 \cdot K_r + G_{in}^2 \cdot K_g + B_{in}^2 \cdot K_b)/ \\ &\quad (R_{in}^2 + G_{in}^2 + B_{in}^2) \\ &= [R_{in} \cdot f(R_{in}) + G_{in} \cdot f(G_{in}) + B_{in} \cdot f(B_{in})]/ \\ &\quad (R_{in}^2 + G_{in}^2 + B_{in}^2) \end{aligned} \qquad \text{(Expression 4)}$$

The input RGB values are multiplied by the correction coefficient C that is used in common, and the gray-level correction is performed.

(Configuration)

Figure 1:
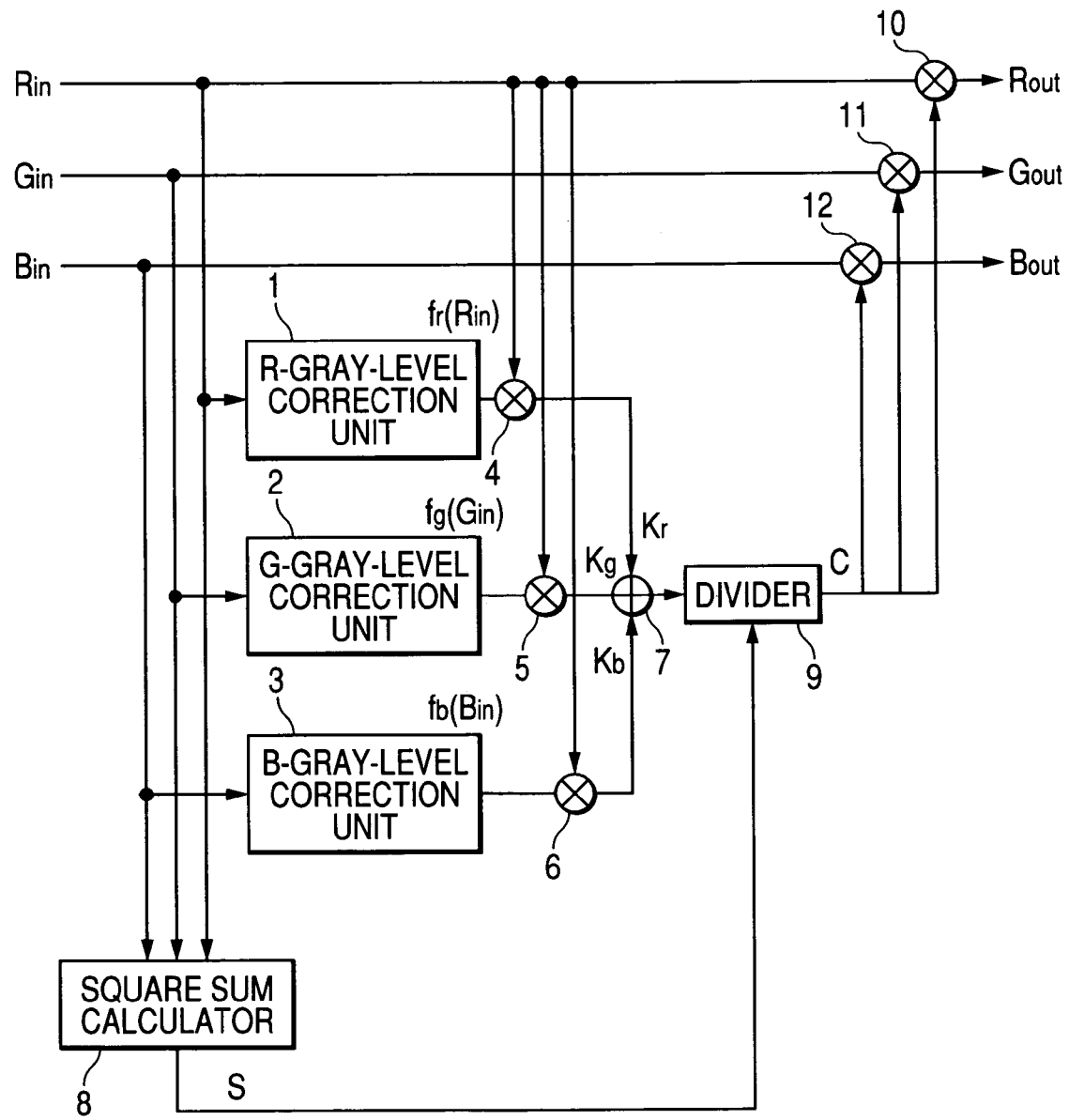
FIG. 1 is a block diagram showing an image signal correction apparatus according to a first embodiment of the present invention.

FIG. 1 is a block diagram for this embodiment. In FIG. 1, an R-gray-level correction unit 1 employs gray level correction function $f_r(R_{in})$ for an input value $R_{in}$, and outputs the results. A G-gray-level correction unit 2 employs gray level correction function $f_g(G_{in})$ for an input value $G_{in}$, and outputs the results. A B-gray-level correction unit 3 employs gray level correction function $f_b(B_{in})$ for an input value $B_{in}$, and outputs the results.

A multiplier 4 multiplies the input value $R_{in}$ by the output of the R-gray-level correction unit 1. A multiplier 5 multiplies the input value $G_{in}$ by the output of the G-gray-level correction unit 2. And a multiplier 6 multiplies the input value Bin by the output of the B-gray-level correction unit 3. An adder 7 then adds the outputs of the multipliers 4, 5 and 6.

A square sum calculator 8 squares each of the individual input RGB values, and adds the squares together. A divider 9 divides the output of the adder 7 by the output of the square sum calculator 8. A multiplier 10 multiplies the input value $R_{in}$ by the output of the divider 9. A multiplier 11 multiplies the input value $G_{in}$ by the output of the divider 9. And a multiplier 12 multiplies the input value $B_{in}$ by the output of the divider 9.

In this embodiment, the R-gray-level correction unit 1, the G-gray-level correction unit 2 and the B-gray-level correction unit 3 constitute correction means. In addition to the R-gray-level correction unit 1, the G-gray-level correction unit 2 and the B-gray-level correction unit 3, the multipliers 4, 5 and 6, the adder 7, the square sum calculator 8 and the divider 9 constitute the correction coefficient calculation means. The value that is finally output by the divider 9 is the correction coefficient C. The multipliers 10, 11 and 12 constitute multiplication means.

Figure 2:
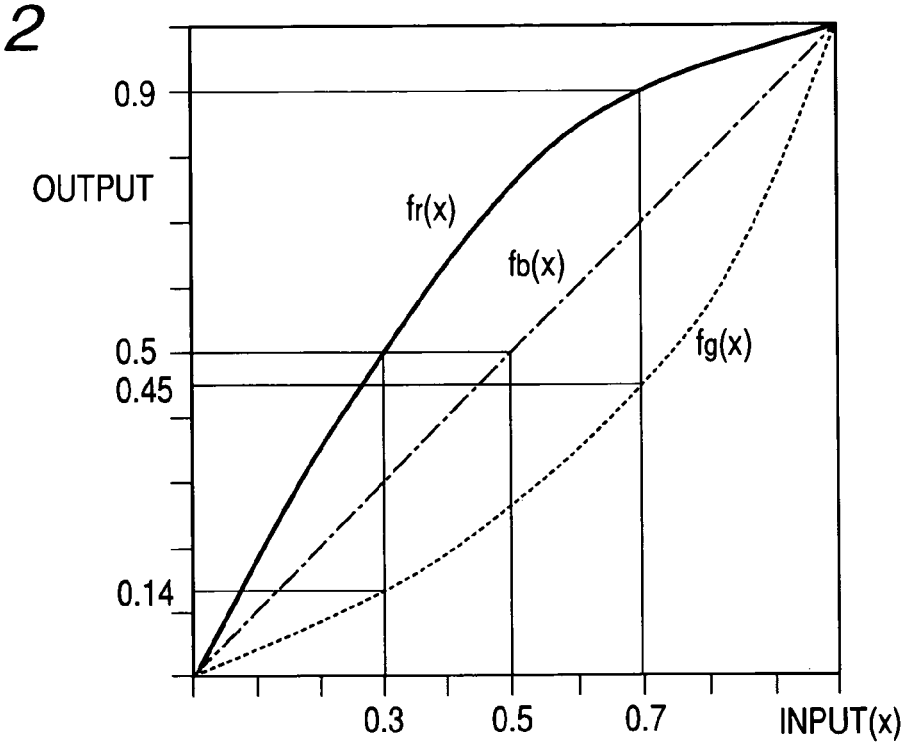
FIG. 2 is a graph showing example gray-level correction functions according to the first embodiment.

FIG. 2 is a graph showing example input/output characteristics of the R-gray-level correction unit 1 (solid line), the G-gray-level correction unit 2 (broken line) and the B-gray-level correction unit 3 (chained line). In FIG. 2, the input/output characteristics of the R-gray-level correction unit 1 are represented as convex, the input/output characteristics of the G-gray-level correction unit 2 are represented as concave, and the input/output characteristics of the B-gray-level correction unit 3 are represented as linear.

When the gray-level correction functions shown in FIG. 2 are employed, and when RGB value $(R_{in}, G_{in}, B_{in})=(0.7, 0.3, 0.5)$ is input to a specific pixel, $R_{in}$ is input to the R-gray-level correction unit 1 and $f_r(R_{in})=0.9$ is output. Similarly, $f_g(G_{in})=0.14$ and $f_b(B_{in})=0.5$ are obtained.

The multipliers 4, 5 and 6 multiplies these obtained values by the input values $R_{in}$, $G_{in}$ and $B_{in}$, and the adder 7 adds the outputs of the multipliers 4, 5 and 6. Then, the adder 7 outputs $R_{in} \times f_r(R_{in}) + G_{in} \times f_g(G_{in}) + B_{in} \times f_b(B_{in}) = 0.7 \times 0.9 + 0.3 \times 0.14 + 0.5 \times 0.5 = 0.92$.

The square sum calculator 8 adds 0.49, 0.09 and 0.25, which are the squares of input values 0.7, 0.3 and 0.5, and outputs a square sum S=0.83.

The output value 0.92 of the adder 7 and the output value 0.83 of the square sum calculator 8 are transmitted to the divider 9, and the correction coefficient C=0.92/0.83=1.11 is obtained that is to be used in common for the individual colors.

The original input values are multiplied by the correction coefficient C, and the final output values $R_{out}=C \times R_{in}=0.776$, $G_{out}=C \times G_{in}=0.333$ and $B_{out}=C \times B_{in}=0.554$ are output. The ratio of $R_{out}$, $G_{out}$ and $B_{out}$ is $R_{out}:G_{out}:B_{out}=0.776:0.333:0.554=0.7:0.3:0.5=R_{in}:G_{in}:B_{in}$ and is substantially equal to the RGB ratio before the gray-level correction, and there is no hue change.

Similarly, when RGB value $(R_{in}, G_{in}, B_{in})=(0.3, 0.7, 0.5)$ is input, $(f_r(R_{out}), f_g(G_{out}), f_b(B_{out}))=(0.5, 0.45, 0.5)$ is obtained, and the output of the divider 9, i.e., the correction coefficient C, is $C=(0.3 \times 0.5 + 0.7 \times 0.45 + 0.5 \times 0.5)/(0.3^2 + 0.7^2 + 0.5^2) = 0.715/0.83 = 0.86$.

The final output value is $(R_{out}, G_{out}, B_{out})=(0.258, 0.603, 0.431)$, and $R_{out}:G_{out}:B_{out}=0.258:0.603:0.431 \cong 0.3:0.7:0.5=R_{in}:G_{in}:B_{in}$, which is substantially equal to the RGB ratio before the gray-level correction, and there is no hue change.

Figure 3:
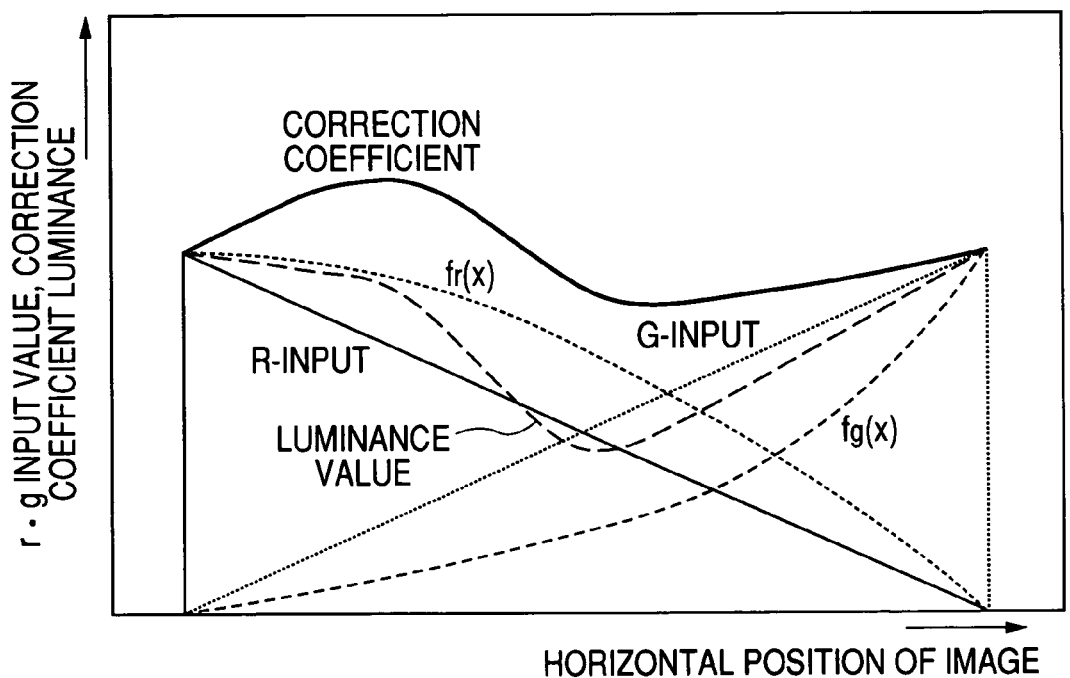
FIG. 3 is a graph showing signals for a cross section of an image, a correction coefficient and an output luminance level.
Figure 12:
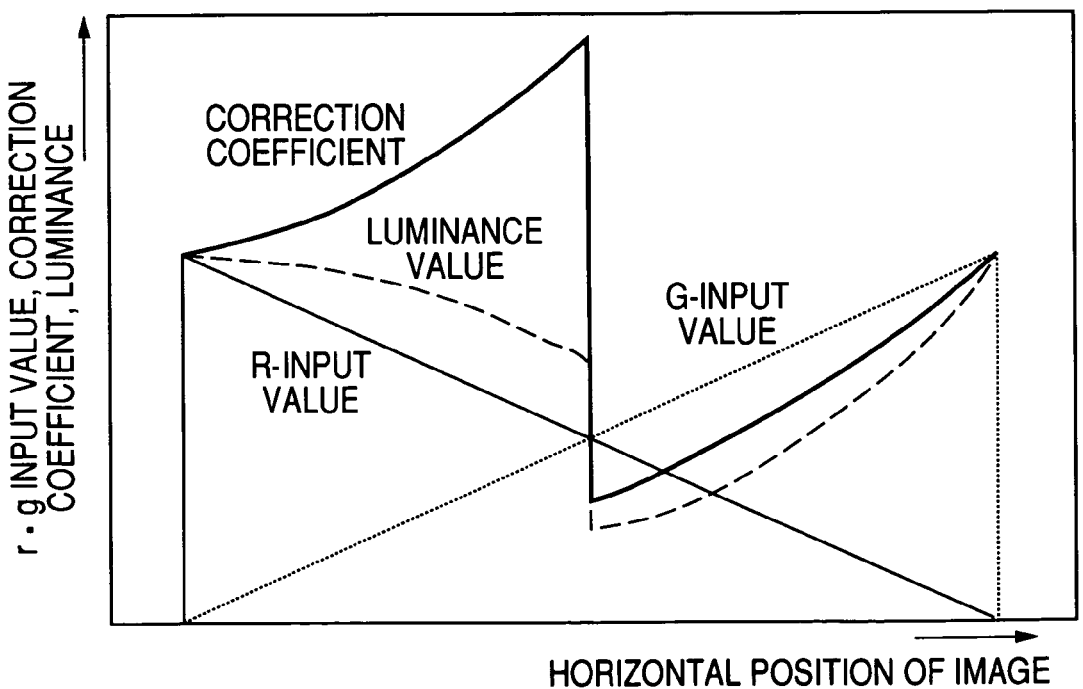
FIG. 12 is a graph showing a specific example wherein color enhancement has been performed by using a conventional technique.

With the configuration of this embodiment, when color correction is performed for an image, like a pattern wherein a defect described as the above problem occurs, the characteristics are as shown in FIG. 3, and the luminance is smoothly changed without the luminance difference shown in FIG. 12. As is described above, according to the embodiment, a color within a specific range can be enhanced and the luminance smoothly changed, while the occurrence of a difference in the luminance is avoided and the hue is unchanged.

Second Embodiment

Figure 4:
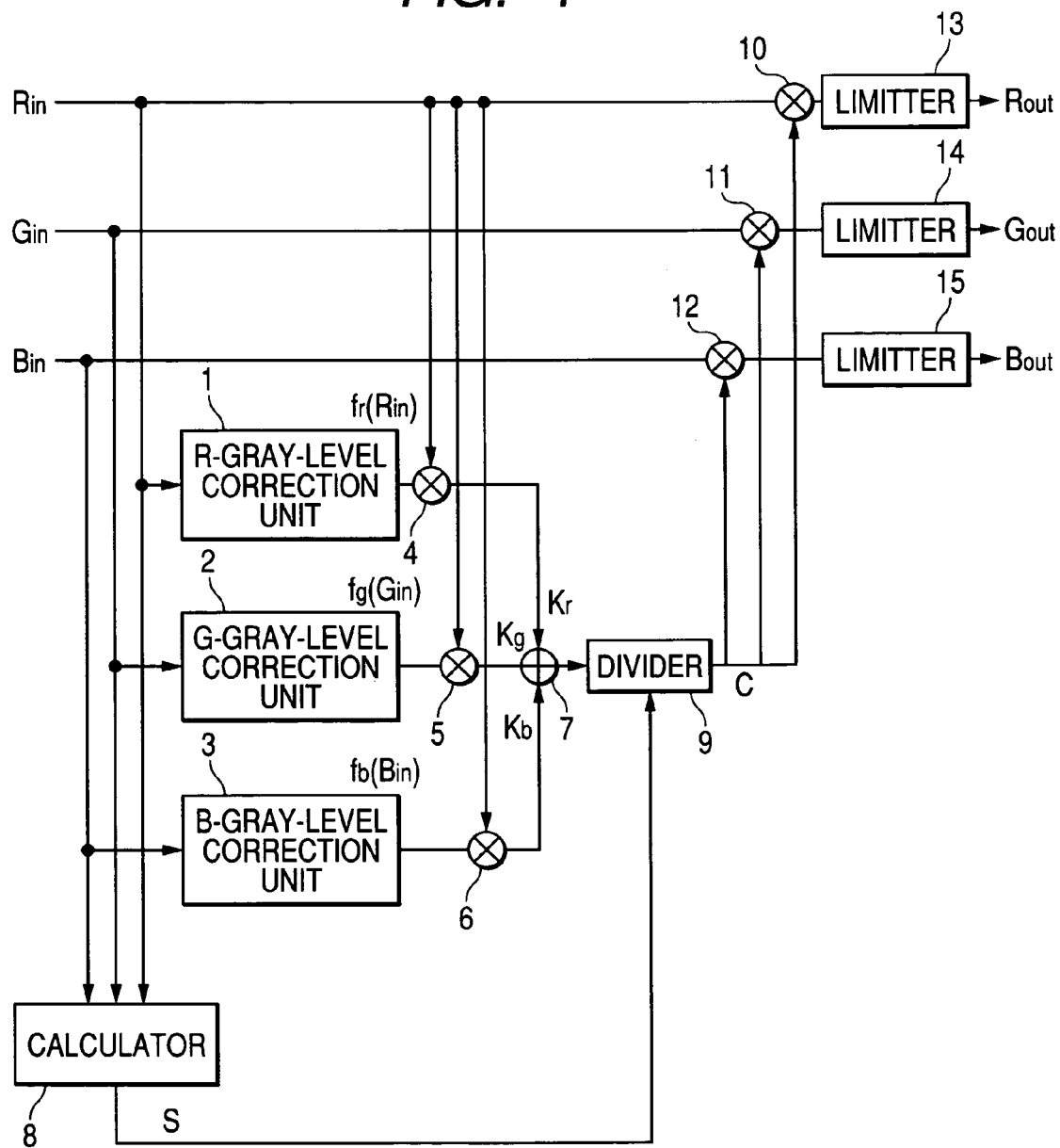
FIG. 4 is a block diagram showing an image signal correction apparatus according to a second embodiment of the present invention.

A second embodiment of the present invention is shown in FIG. 4. In FIG. 4, a limiter 13 limits the output of the multiplier 10 so that the output does not exceed the maximum value available for R. A limiter 14 limits the output of the multiplier 11 so that the output does not exceed the maximum value available for G. And a limiter 15 limits the output of the multiplier 12 so that the output does not exceed the maximum value available for B. Since the other configuration is the same as that for the first embodiment, the same reference numerals are also employed for these corresponding components, and no further explanation for them will be given. In the second embodiment, the limiters 13, 14 and 15 constitute limiting means.

In this embodiment, the same processing as in the first embodiment is performed until values are output by the multipliers 10, 11 and 12. Output $C \times R_{in}$ for the multiplier 10 is transmitted to the limiter 13. The limiter 13 determines whether the value obtained by the multiplier 10 is greater than the maximum value (255 when eight bits are employed) available for R. When the value obtained by the multiplier 10 is not greater than the maximum value, the value is output unchanged. But when the maximum value is exceeded, the maximum value (255 when eight bits are employed) is output. Likewise, the limiters 14 and 15 compare the values for $C \times G_{in}$ and $C \times B_{in}$, output by the multipliers 11 and 12, with the maximum values respectively available for G and B. When the values obtained by the multipliers 11 and 12 are not greater than their respective maximum values, the values are output unchanged. And when the maximum values are exceeded, the maximum values are output.

Through this processing, it is possible to prevent the occurrence of the problem that arises when the correction coefficient C becomes so large that the output value exceeds the available maximum value.

Third Embodiment

Figure 5:
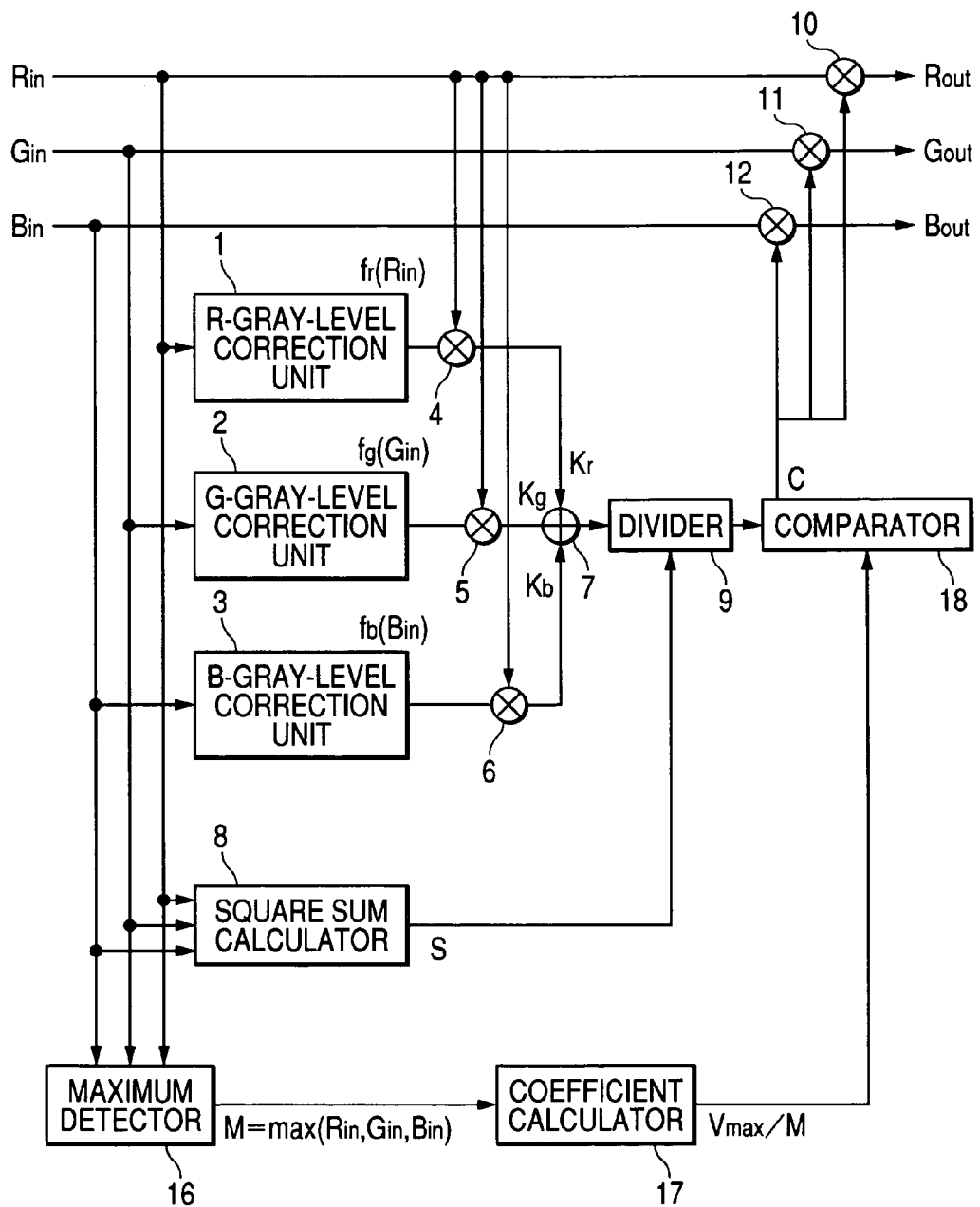
FIG. 5 is a block diagram showing an image signal correction apparatus according to a third embodiment of the present invention.
Figure 6:
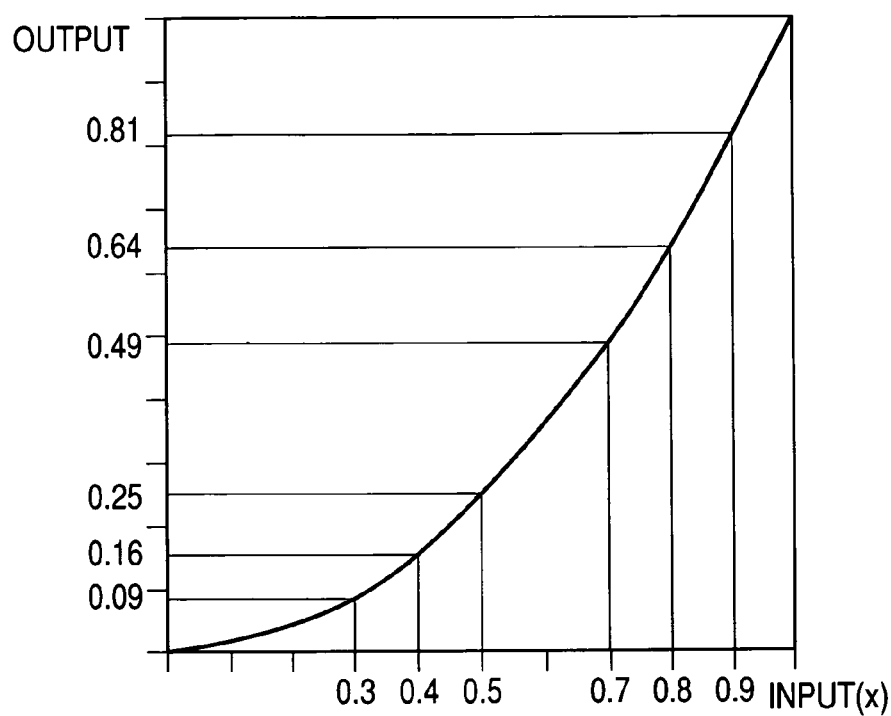
FIG. 6 is a graph showing an example gray-level correction function used to perform a conventional gray-level correction process.
Figure 7:
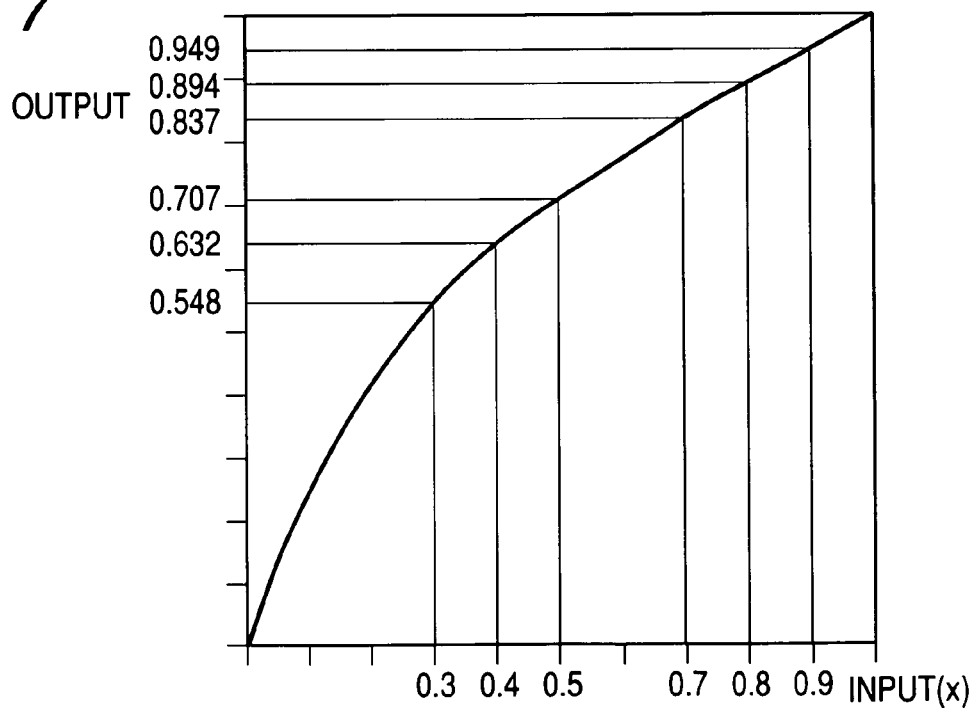
FIG. 7 is a graph showing another example gray-level correction function used to perform a conventional gray-level correction process.
Figure 8:
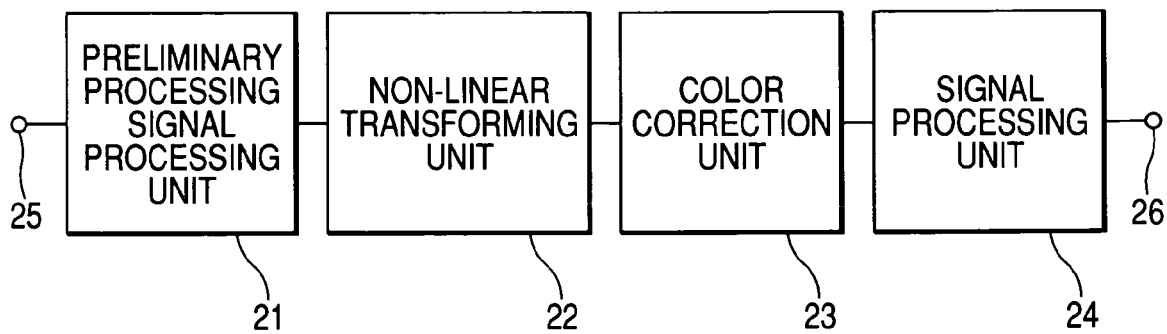
FIG. 8 is a block diagram for explaining the conventional gray-level correction process.
Figure 9:
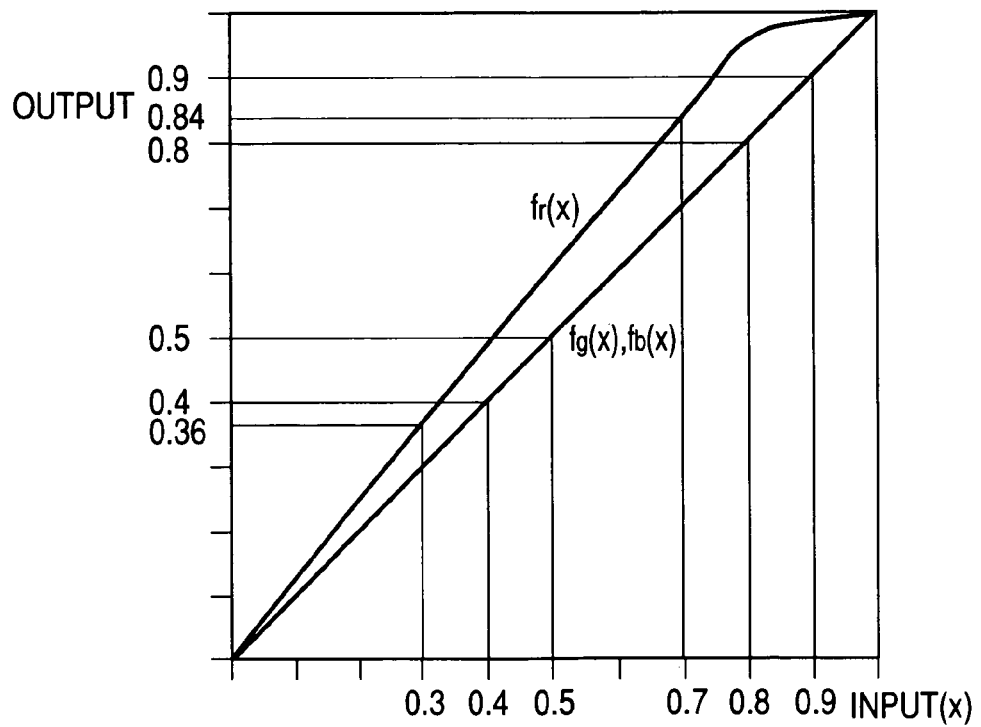
FIG. 9 is a graph showing an example correction function employed to perform color enhancement using a conventional technique.
Figure 10:
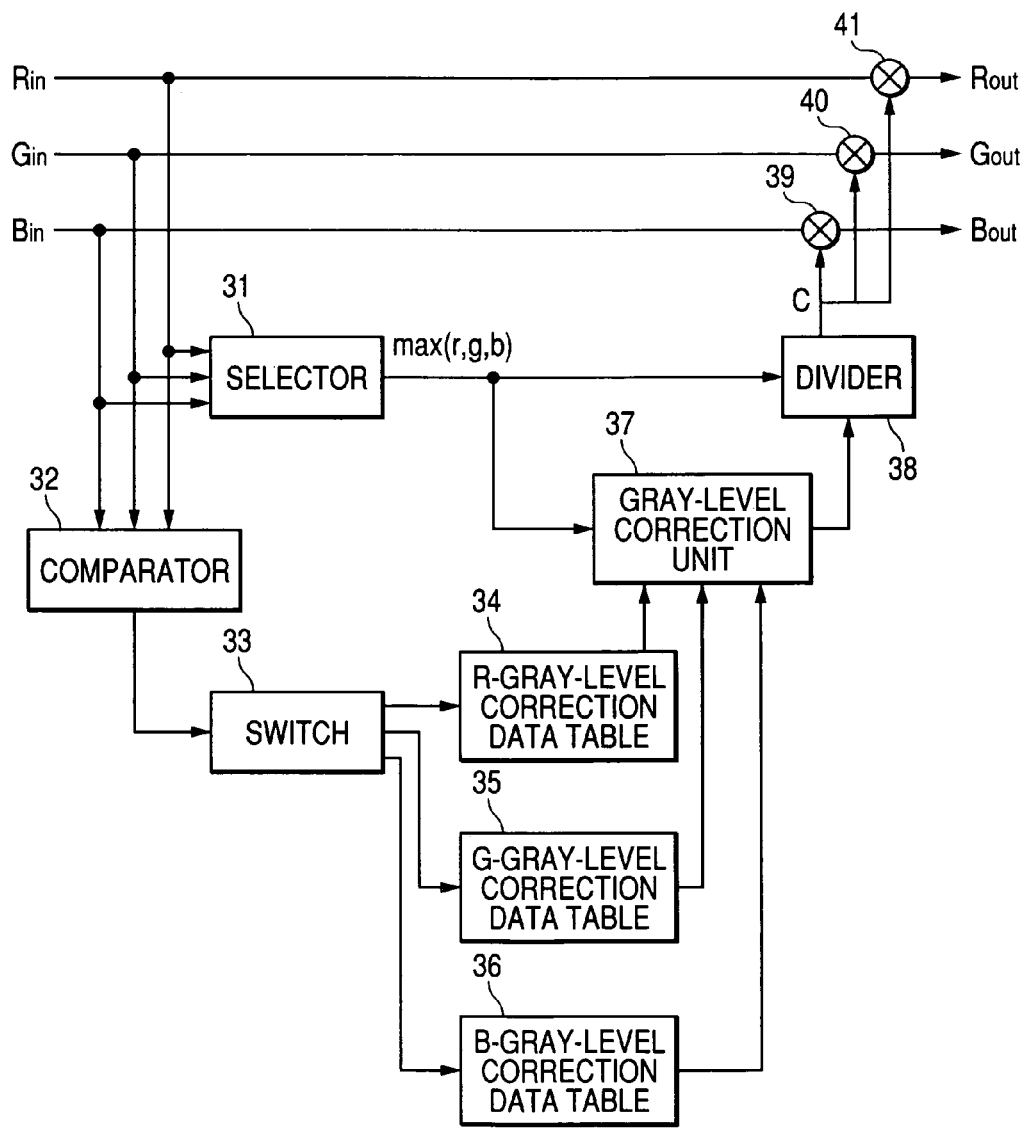
FIG. 10 is a block diagram showing an image signal correction apparatus that performs color enhancement by using a conventional technique.
Figure 11:
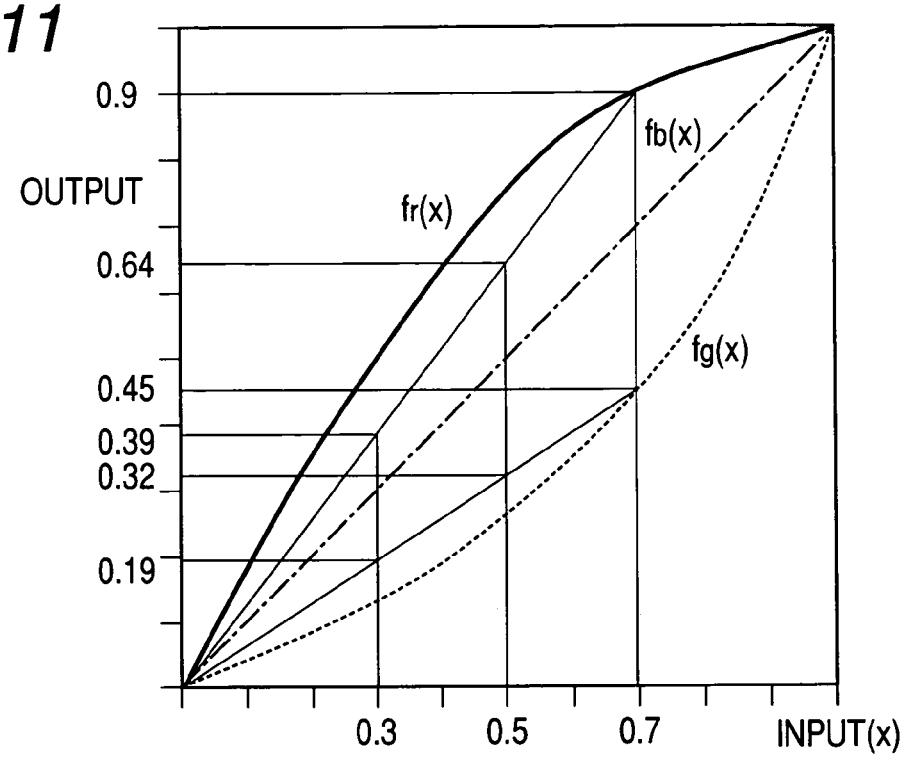
FIG. 11 is a graph showing an example gray-level correction function for explaining the operation wherein color enhancement is performed using a conventional technique.

A third embodiment of the present invention is shown in FIG. 5. In FIG. 5, a maximum detector 16 detects and outputs the maximum RGB values that are input. A coefficient calculator 17 outputs a value obtained by dividing the maximum values available for RGB by the output of the maximum detector 16. A comparator 18 compares the output of a divider 9 with the output of the coefficient calculator 17, and outputs the smaller value. Since the remainder of the configuration is the same as that for the first embodiment, the same reference numerals are employed to denote the corresponding components, and no further explanation for them will be given. In this embodiment, the maximum detector 16 and the coefficient calculator 17 constitute the maximum value calculation means, and the comparator 18 and multipliers 10, 11 and 12 constitute the comparison and multiplication means.

In this embodiment, the same processing as in the first embodiment is performed until a value is output by the divider 9. The input RGB values $R_{in}$, $G_{in}$ and $B_{in}$ are transmitted to the maximum detector 16, and the maximum value is output. The maximum RGB value output by the maximum detector 16 is then transmitted to the coefficient calculator 17. The coefficient calculator 17 divides, by the input value, a maximum value $V_{max}$ (255 when eight bits are employed) available for the RGB, and outputs the result to the comparator 18. The comparator 18 compares the output of the divider 9 with the output of the coefficient calculator 17, and outputs the smaller value. Thereafter, the value output by the comparator 18 is transmitted to the multipliers 10, 11 and 12, and this value is used to multiply the input signals $R_{in}$, $G_{in}$ and $B_{in}$ and obtain the final output values $R_{out}$, $G_{out}$ and $B_{out}$.

In the first embodiment, when the correction coefficient C is greater than $V_{max}/\max(R_{in}, G_{in}, B_{in})$, one of the output values $R_{out}$, $G_{out}$ and $B_{out}$ would exceed the value $V_{max}$. In this embodiment, however, since the calculation $V_{max}/\max(R_{in}, G_{in}, B_{in})$ is performed in advance by the coefficient calculator 17, when the comparison is performed, a smaller value, either $V_{max}/\max(R_{in}, G_{in}, B_{in})$ or the correction coefficient C, is output. Therefore, color correction can be performed without the maximum available value being exceeded.

In the first to the third embodiments, the correction coefficient C has been calculated by using (Expression 4); however, another expression may be employed, just so long as a correction coefficient that satisfies the conditions of the invention can be obtained.

Furthermore, the configurations for the first to the third embodiment have been explained while referring to the block diagrams; however, the configurations that provide the present invention are not limited to those in the embodiments.

Figure 13:
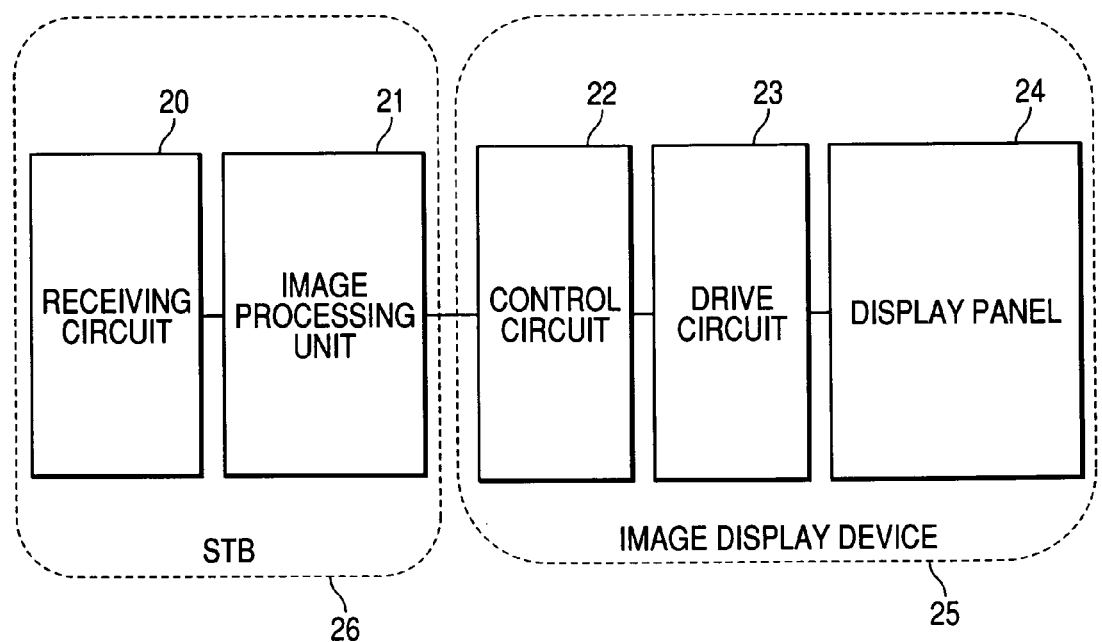
FIG. 13 is a block diagram showing a television set according to the present invention.

FIG. 13 is a block diagram showing a television set according to the present invention. A receiving circuit 20, which is a tuner or a decoder, for example, receives data broadcast across a network, and outputs decoded image data to an image processing unit 21. The image processing unit 21 includes a γ correction circuit, a resolution conversion circuit, an I/F circuit, and an image signal correction apparatus such as is described in the above embodiments. The image processing unit 21 converts image data it receives to prepare suitable image data for a display format, and outputs the resultant data to an image display device 25. The image display device 25 includes a display panel 24, a drive circuit 23 and a control circuit 22. When image data are received, the control circuit 22 performs signal processing, such as a correction process, that is appropriate for the display panel 24, and outputs the image data and various control signals to the drive circuit 23. Based on the thus received image data, the drive circuit 23 outputs a drive signal to the display panel 24 and a TV image is displayed thereon.

The receiving circuit 20 and the image processing unit 21 may be installed, separate from the image display device 25, in a set top box (STB) 26, or may be installed with the image display device 25 in a single cabinet.

This application claims priority from Japanese Patent Application No. 2004-042487 filed on Feb. 19, 2004, which is hereby incorporated by reference herein.

What is claimed is:

1. An image signal correction method, for correcting luminance signals input for three colors in accordance with at least two different gray-level correction functions, comprising the steps of:

calculating a correction coefficient common to the luminance signals input for the individual colors, employing the gray-level correction functions for the individual colors; and multiplying the luminance signals input by the correction coefficient, wherein, when the luminance signals input for three colors are respectively $A_1$, $A_2$ and $A_3$, and the gray-level correction functions for the individual colors are respectively $f_1(x)$, $f_2(x)$ and $f_3(x)$, the correction coefficient C meets:

$$C = \frac{A_1 \cdot f_1(A_1) + A_2 \cdot f_2(A_2) + A_3 \cdot f_3(A_3)}{A_1^2 + A_2^2 + A_3^2}. \quad \text{(Expression 1)}$$

2. The image signal correction method according to claim 1, further comprising:

a step of limiting so as to prevent values obtained by multiplying the luminance signals input by the correction coefficient from exceeding an available maximum value which the corrected luminance signal can be.

3. The image signal correction method according to claim 1, further comprising:

a step of dividing an available maximum value which the corrected luminance signal can be by a maximum value among the luminance signals input for three colors, wherein the correction coefficient by which the luminance signals input for three colors is multiplied is a minimum value among the value derived by dividing by the correction coefficient calculated.

4. An image signal correction apparatus, for correcting luminance signals input for three colors in accordance with at least two different gray-level correction functions, comprising the steps of:

a correction coefficient calculating unit for calculating a correction coefficient common to the luminance signals input for the individual colors, employing the gray-level correction functions for the individual colors; and a multiplying unit for multiplying the luminance signals input by the correction coefficient, wherein, when the luminance signals input for three colors are respectively $A_1$, $A_2$ and $A_3$, and the gray-level correction functions for the individual colors are respectively $f_1(x)$, $f_2(x)$ and $f_3(x)$, the correction coefficient C meets:

$$C = \frac{A_1 \cdot f_1(A_1) + A_2 \cdot f_2(A_2) + A_3 \cdot f_3(A_3)}{A_1^2 + A_2^2 + A_3^2}. \quad \text{(Expression 2)}$$

5. The image signal correction apparatus according to claim 4, further comprising:

a limiting unit for limiting so as to prevent values obtained by multiplying the luminance signals input by the correction coefficient from exceeding an available maximum value which the corrected luminance signal can be.

6. The image signal correction apparatus according to claim 4, further comprising:

a dividing unit for dividing an available maximum value which the corrected luminance signal can be by a maximum value among the luminance signals input for three colors, wherein the correction coefficient by which the luminance signals input for three colors is multiplied is a minimum value among the value derived by dividing by the correction coefficient calculated.

* * * * *